Patented May 19, 1931

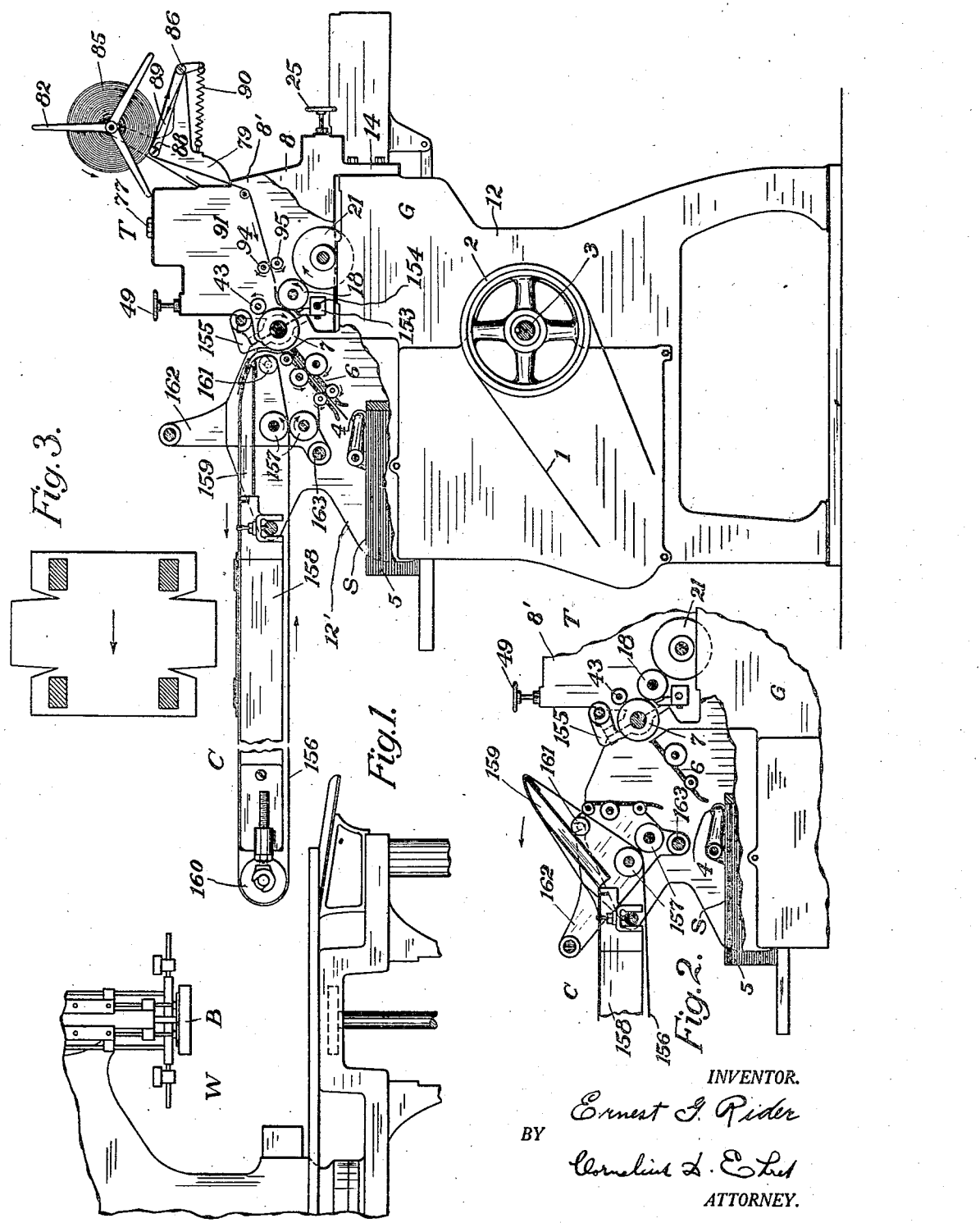

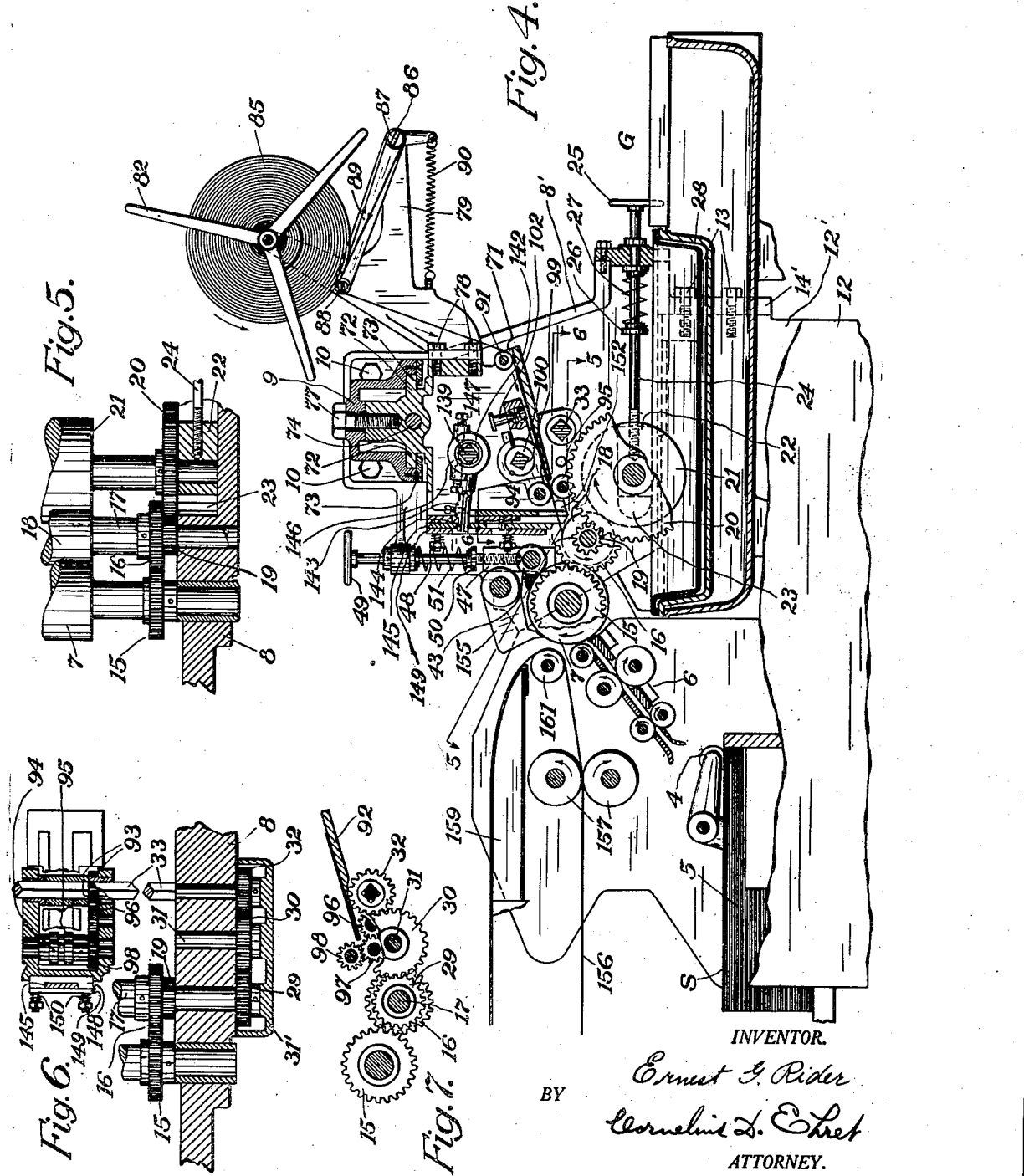

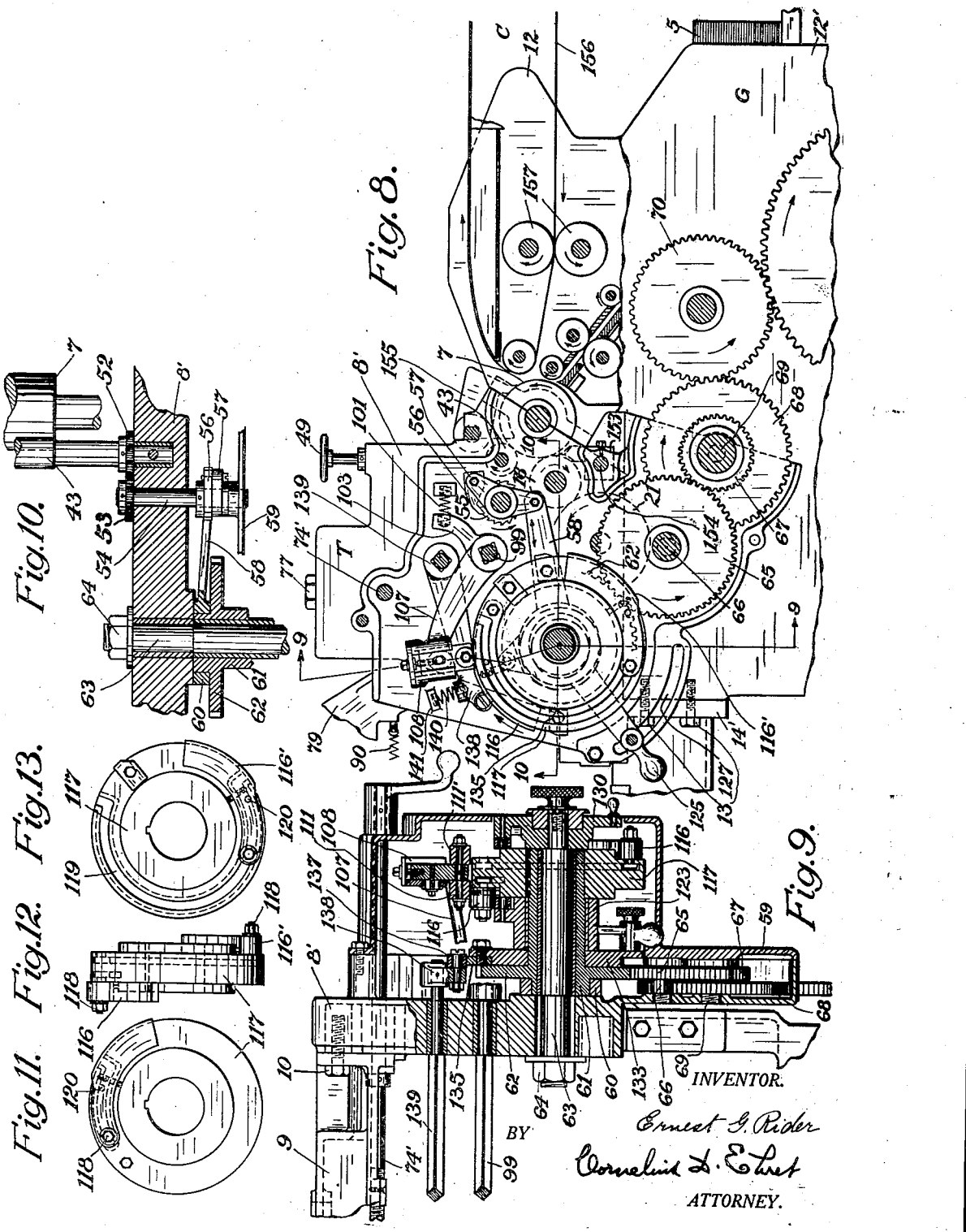

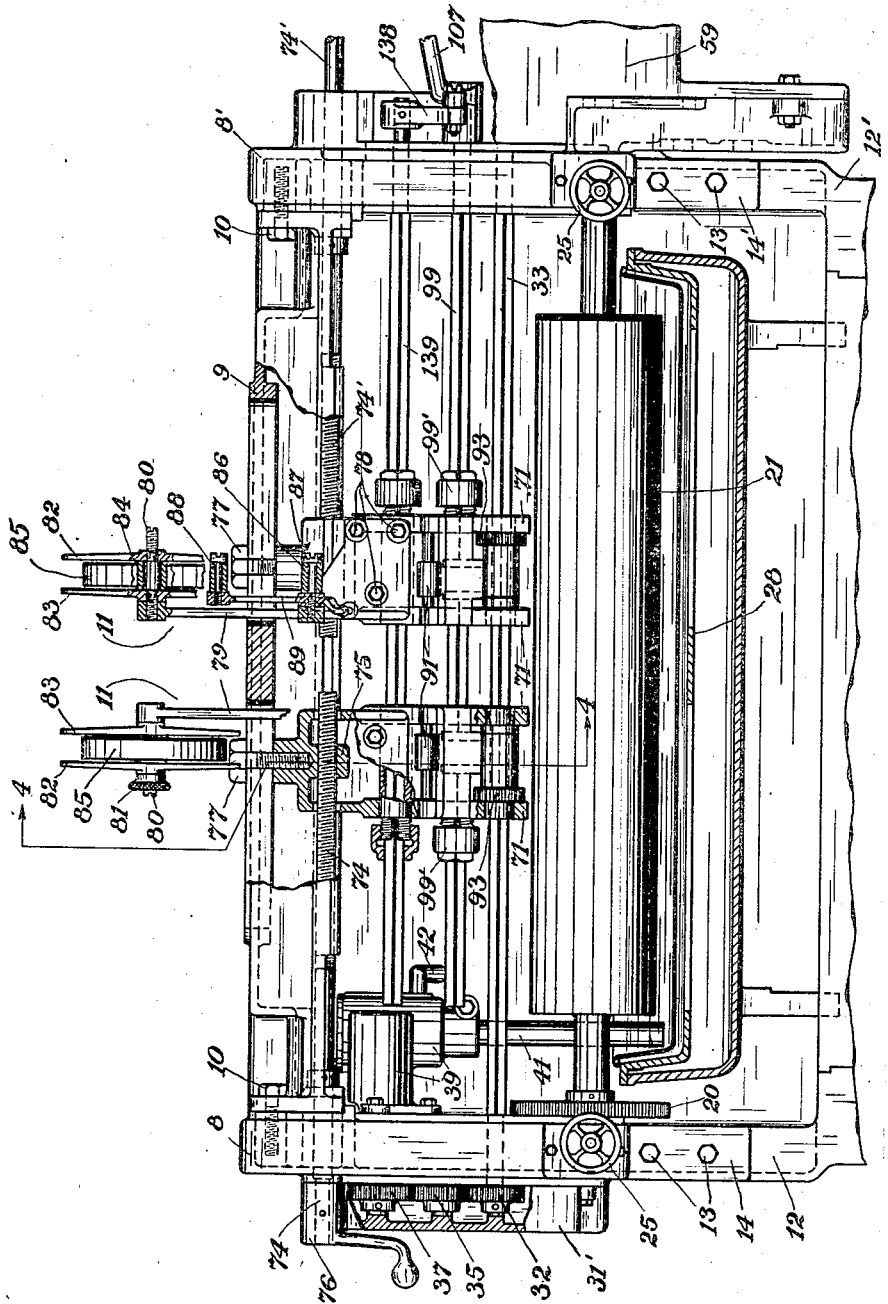

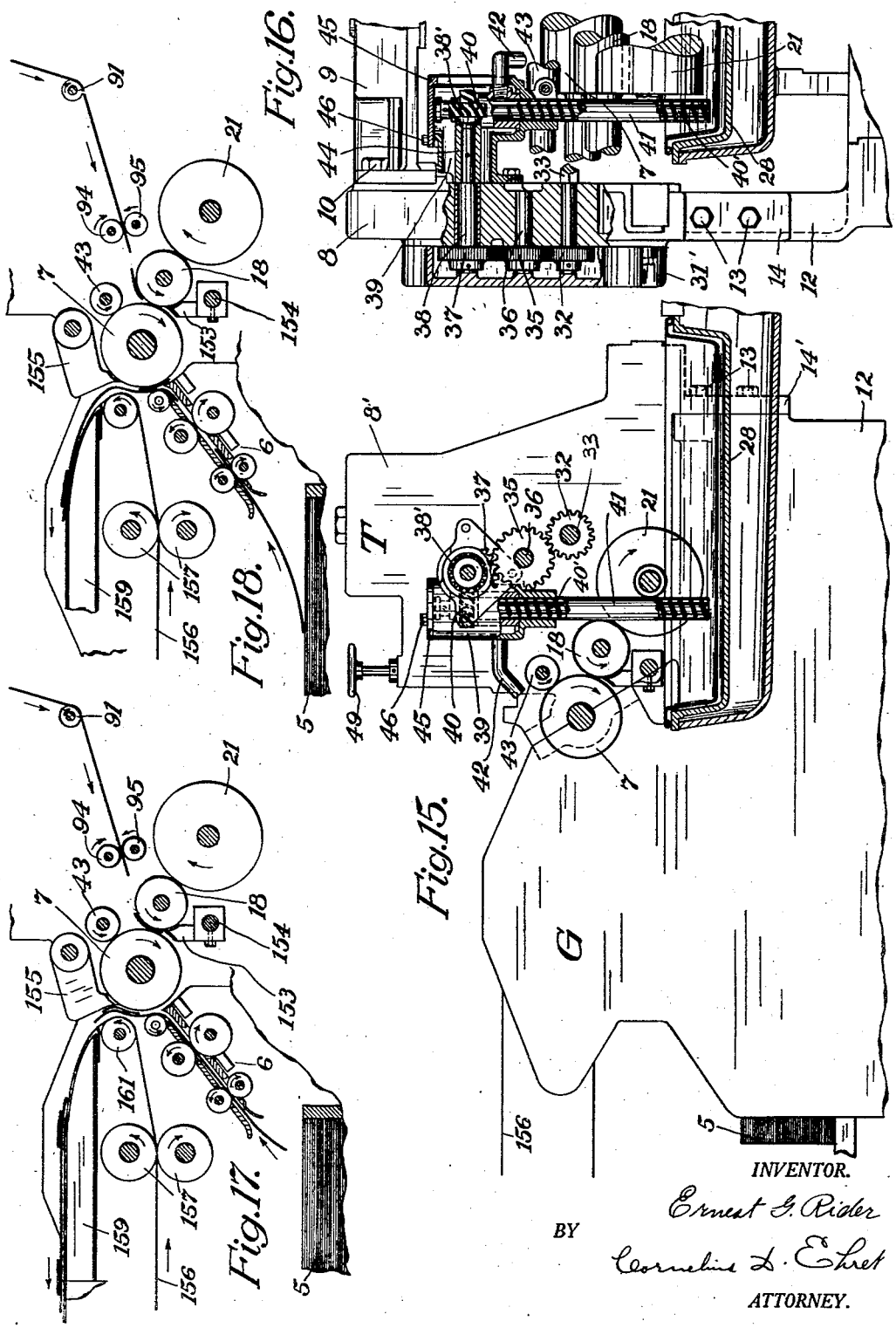

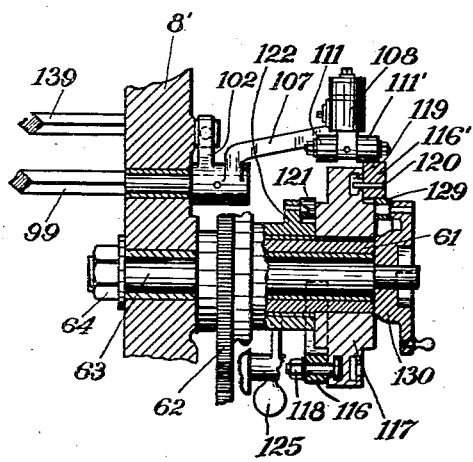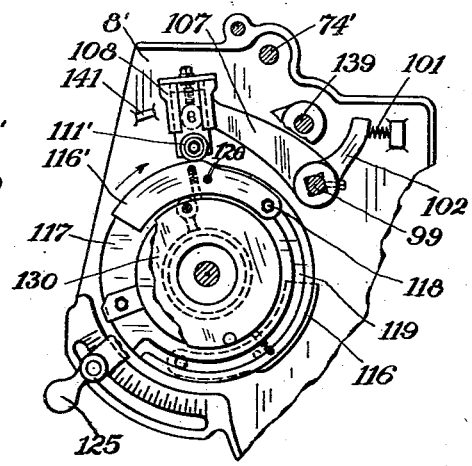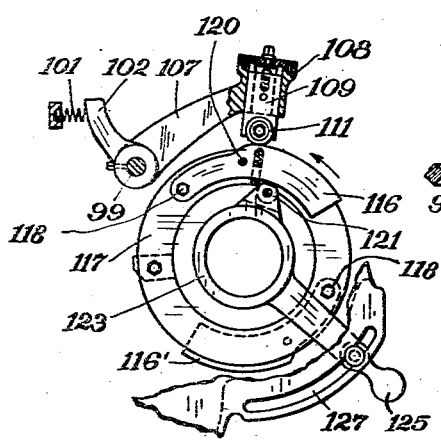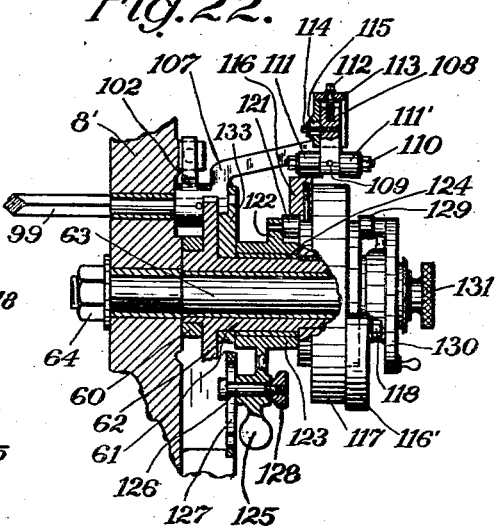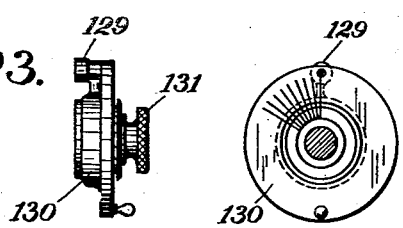

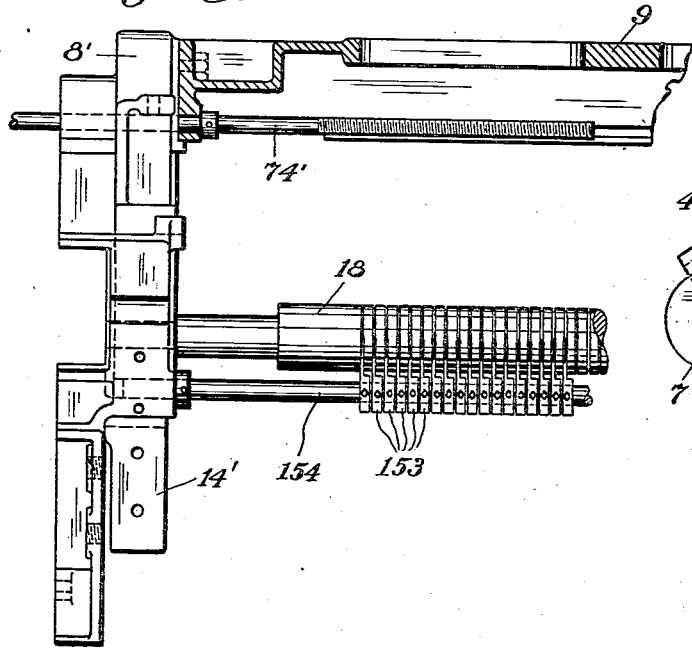
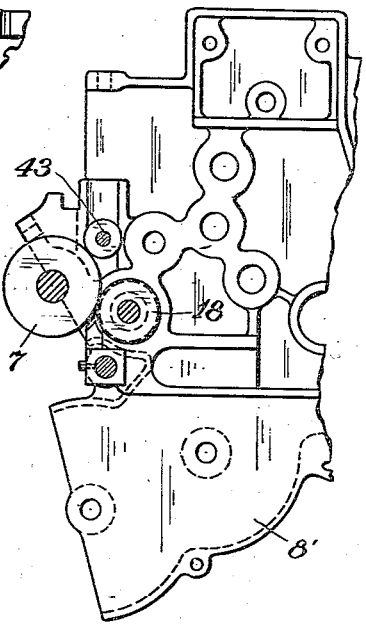
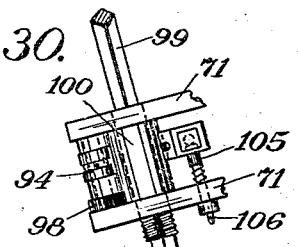
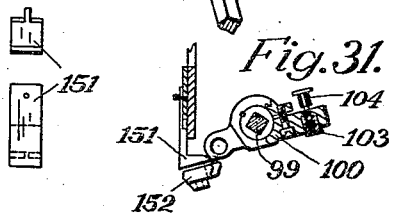
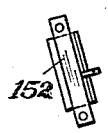
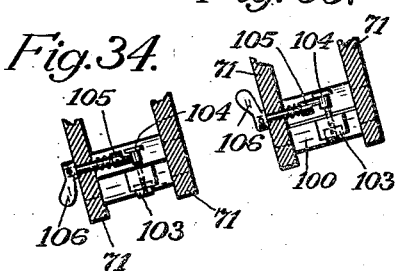
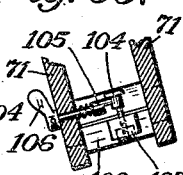

1,806,181

UNITED STATES PATENT OFFICE

ERNEST G. RIDER, OF PHILADELPHIA, PENNSYLVANIA, ASSIGNOR TO STOKES AND SMITH COMPANY, OF PHILADELPHIA, PENNSYLVANIA, A CORPORATION OF PENNSYLVANIA

WRAPPER TABBING MECHANISM

Application filed October 19, 1927. Serial No. 227,144.

My invention relates to a method of and apparatus for applying individual sheets, wrappers, labels, or the like, hereinafter generically termed "wrappers" provided with reinforcing or staying elements or tabs, to cartons, containers, and particularly to boxes, and especially to unstayed boxes, hereinafter generically termed "boxes".

In accordance with my invention, during application of a coating of adhesive to a wrapper and particularly while a portion thereof remains to be coated, tabs, preferably having adhesive applied to both faces, are applied thereto, and, more particularly, the substantially simultaneous application of the adhesive coating and tabs to the wrapper is effected during continuous movement of the wrapper.

Further in accordance with my invention, reinforcing elements or tabs are coated and transported, particularly to the point of their application to a wrapper, by engagement with an adhesive coated member, which preferably applies adhesive to the box-engaging face of the wrapper during application of tabs thereto.

Further in accordance with my invention, there is provided a tabbing mechanism adapted to be attached as a unit to an apparatus for applying adhesive to individual wrappers in succession and comprises tabbing units operating in timed relation to the sheet-feeding mechanism of the gluing device to deliver tabs of desired length and in proper spaced relation to the wrapper-coating-roll of the gluing apparatus.

My invention relates to one type of apparatus utilizable for performing a method of tabbing wrappers generally disclosed in my U. S. Letters Patent No. 1,599,500, granted September 14, 1926.

My invention resides in the method and apparatus hereinafter described and claimed.

For an illustration of some of the various forms my invention may take, reference is to be had to the accompanying drawings, in which:

Fig. 1 is a side elevational view, partly in section, of apparatus embodying my invention.

Fig. 2 is a side elevational view, partly in section, illustrating details of construction of the wrapper-conveying and adhesive-applying mechanisms.

Fig. 3 is a plan view of a wrapper having tabs applied thereto by mechanism herein described.

Fig. 4 is a side elevational view, in section, illustrating details of the tabbing mechanism unit mounted on an adhesive-applying device.

Fig. 5 is a fragmentary plan view, in section, taken on the line 5—5 of Fig. 4, showing tab-coating and tab-transporting mechanism.

Fig. 6 is a plan view, taken on the line 6—6 of Fig. 4, showing in detail part of the tab-feeding and cutting mechanism.

Fig. 7 is a side elevational view, partly in section, showing the driving mechanism for the tab-feeding rolls.

Fig. 8 is a side elevational view of the tabbing unit mounted on an automatic gluing apparatus and in association with wrapper-conveying mechanism.

Fig. 9 is an end elevational view, partly in section, taken on the line 9—9 of Fig. 8, disclosing mechanism for effecting the adjustments necessary to effect changes in the length and spacing of tabs as applied to wrappers of different shapes and sizes.

Fig. 10 is a fragmentary plan view taken on the line 10—10 of Fig. 8, disclosing the driving mechanism for intermittently rotating a scraper roll which controls the amount of glue on the wrapper-coating roller.

Figs. 11, 12 and 13 are face and end views of the timing disk shown in Fig. 9.

Fig. 14 is an end elevational view, partly in section, showing the association of the two tabbing mechanisms and the tabbing unit to the automatic gluing mechanism.

Fig. 15 is a side elevational view, partly in section, showing a pump and driving mechanism for supplying adhesive to the wrapper-coating roller.

Fig. 16 is an end elevational view, partly in section, of the mechanism shown in Fig. 15.

Figs. 17 and 18 are diagrammatic sketches illustrating the relative positions of a wrapper and tabs during the wrapper-coating and tab-applying operation.

Figs. 19 to 22, 24 and 25 are detail views of the timing disk and associated mechanism disclosed in Figs. 8 and 9 as adjusted for different lengths of and spacing of tabs.

Figs. 23 and 23a are side and front elevational views, respectively, of a calibrated adjusting dial associated with the timing disk.

Fig. 28 is a side elevational view, partly in section, disclosing the tabbing unit adjusting mechanism and the tab-transporting roll and associated strippers.

Fig. 29 is a side elevational view of Fig. 28 disclosing in part the outline of the side frame of the tab-applying unit.

Figs. 30 and 31 are detail views of the tab-strip feeding control mechanism.

Figs. 32 and 33 are stripping devices associated with the mechanism disclosed in Figs. 30 and 31.

Figs. 34 and 35 are detail views of manually operable means for braking disclosed in Figs. 30 and 31.

Figure 24:
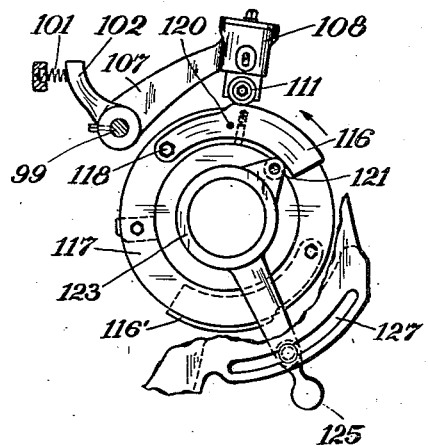

Referring to the drawings, particularly Fig. 1, there is illustrated an adhesive-applying unit G, mechanism generically indicated at T for severing tabs, applying the severed tabs to a wrapper during coating of the wrapper with adhesive, conveying unit C, and a wrapping unit W.

The adhesive-applying unit G may be of any suitable type capable of applying adhesive to wrappers or box wrapping paper, or other suitable material, and delivering coated wrappers in succession, preferably at uniform intervals. For example, the unit G may be of the same general type disclosed in Nitsch and Federwitz Letters Patent, No. 1,472,614, granted October 30, 1923, or in Stokes Letters Patent, No. 1,611,693, granted December 21, 1926 or in Nitsch and Baker, application Serial No. 3316, filed January 19, 1925, or in Federwitz and Bailey application Serial No. 40,769, filed July 1, 1925, or in Davis application Serial No. 122,096, filed July 13, 1926. In the mechanisms of the aforesaid patents and applications the wrappers as stacked in the gluing mechanism are one-piece wrappers. As disclosed in Stokes application, Serial No. 175,991, filed March 17, 1927, there may be associated with the gluing mechanism apparatus for forming a composite wrapper from stacks of component parts and feeding the wrappers as formed and in succession to the adhesive-applying roll of the gluing unit.

The tabbing unit or mechanism T may be of the general character as disclosed, for example, in U. S. Letters Patent to Reifsynder and Schwerdtle, No. 1,060,026, granted April 29, 1913, or to Nitsch, Weightman and Streeper No. 1,451,782, granted April 17, 1923, or to Stokes, No. 1,611,693, granted December 21, 1926. However, the tabbing mechanism herein disclosed is specifically different in certain important details of construction and operation, and in its association with the other units above named.

The conveying unit C may be of the same general character disclosed in the aforesaid Federwitz and Bailey application, Serial No. 40,769, or in the Federwitz and Bailey application, Serial No. 70,462, filed November 21, 1925, or, as shown, specifically the same as that disclosed in the aforesaid Davis application.

The wrapping machine W may be of any suitable character, for example, as illustrated in U. S. Letters Patent to Smith, No. 691,329, Nitsch and Federwitz, No. 1,540,900, or Federwitz and Bailey, Nos. 1,541,036 and 1,541,255.

In the example illustrated, and referring particularly to Figs. 1 and 4, the adhesive-applying unit G is of the same general type disclosed in the aforesaid Nitsch and Federwitz Letters Patent, No. 1,472,614. Unit G is driven at suitable speed by any suitable source of power through the belt 1 which engages the periphery of a pulley 2 connected as by a key to the main driving shaft 3 of the gluing unit. At predetermined intervals, as explained more fully in the aforesaid Nitsch and Baker application, the suction roller 4 functions to deliver single wrappers S in succession from the stack 5 of unglued wrappers through the rotary feed roll mechanism designated generally at 6 into engagement with the glue distributing roll 7 which is continuously driven in any suitable manner, as by a train of gears, not shown, from the main drive shaft 3.

The tabbing mechanism T is removable as a unit from the automatic gluer G and comprises the side frames 8, 8' suitably connected, as by a cross bar 9 fastened at each end, by bolts 10, or the like, to the side frames. As disclosed most clearly in Fig. 14, the individual tabbing units 11 and their associated driving and adjusting mechanisms are carried directly or indirectly by the side frames 8, 8' which are bolted to the corresponding side frames 12, 12' of the automatic gluer, by bolts 13 or the like which pass through extensions 14, 14' of the tabbing unit side frames 8, 8' into tapped holes in the side frames 12, 12' of the gluer or adhesive-applying unit G. Affixed to one end of the shaft on which roller 7 is mounted is a gear 15 which, when the tabbing unit is in position, engages the gear 16 pinned to the shaft 17 of the intermediate glue roller 18. A gear 19 also secured to the shaft 17 meshes with gear 20 affixed to the shaft on which the glue-transporting and agitating roll 21 is mounted, Fig. 5. As shown in Figs. 4 and 5, the ends of the shaft of roll 21 are each journaled in a block 22 slidable in a groove 23 of the corresponding side frame 8 or 8' and adjustable therein by a threaded rod 24 which passes through an end wall of the side frame and is provided with a hand wheel 25. Between a collar 26 affixed to the rod 24 and an abutment on the end frame there is disposed a spring 27 which continuously forces the glue roll 21 inwardly to its adjusted position but which permits movement of the roll in the reverse direction therefrom in the event that an obstruction passes or tends to pass between the rolls 18 and 21. As shown in Figs. 4 and 14, when the tabbing unit is in position, a considerable portion of the periphery of the roller 21 is beneath the surface of adhesive contained within the reservoir or tray 28 disposed in the usual manner, as in the aforesaid applications and patents referred to, between the side frames of the gluing unit G, and is driven in a clockwise direction to agitate the glue and to apply a coating thereof to the intermediate roller 18 for the purpose hereinafter more fully explained.

To an extension of shaft 17, which extends through the side frame 8, there is secured, as shown in Figs. 6 and 7, a gear 29 which meshes with and drives gear 30 mounted on a stud shaft 31 fastened in the side frame 8 and which in turn meshes with and drives gear 32 disposed at one end of a shaft 33 which extends between the side frames 8, 8'. The gear train 29, 30 and 32 may be enclosed within a removable housing or cover 31' suitably secured to the side frame 8. As shown most clearly in Figs. 14, 15, and 16, the gear 32, through an idler gear 35 mounted on stud shaft 36, drives the gear 37 affixed to shaft 38 which projects through the side frame 8 into the interior of a pump casing 39 bolted to the side frame 8. The cover plate 31' suitably fastened to the side frame 8 may be utilized to enclose the gear train 32, 35, and 37.

The inner end of the shaft 38 is provided with a worm gear 38' which engages worm gear 40 suitably affixed to a rod 40' which extends downwardly through a tube 41 below the surface of the adhesive in the reservoir 28 and is provided with a spiral thread which, during rotation of the rod 40' in the proper direction, as when driven by shaft 38, transports the glue upwardly through a tube or conduit 41 and discharges it through the pipe 42 to form a fountain of glue between the approaching surfaces of the wrapper-coating roll 7 and a roller 43, whose purpose and operation will hereinafter be more fully described. The bearing 44 disposed within the pump casing 39, through which the shaft 38 passes, is disposed considerably above the glue outlet so that no trouble is experienced due to the character of the fluid transported by the pump mechanism. The pumping rod 40' may be readily removed for the purpose of replacement, cleaning, or repair, by removing or swinging to one side the plate 45 held in position, as by cap screw 46, to close the open upper end of the pump housing, whereupon rod 40' may be lifted out by rotating it slightly in the direction reverse to that in which it is driven by the gear 38'. During rotation of the shaft 40' in normal operation of the machine, the gear 38' exerts a downward thrust on the rod 40' forcing the lower face of the gear 40 against a bearing surface which constitutes the sole bearing for the pump rod.

The position of the roller 43 may be varied in somewhat the same manner as that of roller 21, in that the ends of the roller or shaft on which it is mounted are each journaled as shown in Fig. 4, in a block 47 whose position may be varied by a rod 48 which threadably engages a hole on the block and whose rotation may be effected by a hand wheel 49 to vary the distance between rollers 43 and 7. Between a collar 50 affixed to the rod 48 and a fixed abutment on the frame there is disposed a spring 51 which urges the roller 43 to its adjusted position but permits its retraction if foreign matter passes between the rollers 7 and 43. The roller 43 serves as a scraper, and to prevent accumulation of foreign matter and wear of the roller it is intermittently rotated by mechanism to be described, in a manner and for substantially the same purpose, generally disclosed in Federwitz application Serial No. 187,646, filed April 29, 1927.

Referring to Figs. 8 to 10, a reduced end of the roller 43, or of a shaft on which it is mounted, is journaled in the side frame 8' and is provided with a gear 52 which is driven by gear 53 fastened to the inner end of a shaft 54 which passes through the side frame 8' and to which is secured on the other exterior end, a ratchet 55 adapted to be rotated by the pawl 56 loosely pivoted at one end of a bell crank arm 57, loosely mounted on shaft 54 and to the other arm of which is connected the eccentric rod 58. The end of the shaft 54 remote from gear 53 is received by a boss member of a removable cover or housing 59 which is fastened in any desired manner, as by bolts, to the side frame 8' and which encloses additional mechanism hereinafter described. An eccentric strap 60 may be integrally formed with an eccentric rod 58 and embraces an eccentric 61 which, as shown, constitutes a hub portion of a gear 62 loosely journaled on a stud shaft 63 provided with a threaded extension which passes through the side frame 8' and is clamped thereto, as by nut 64. The gear 62 is driven by gear 65 rotatably mounted on stud shaft 66 threaded into an extension of side frame 8' and which in turn is driven by and engages gear 67 rotatable with gear 68. The gears 67 and 68 may be formed as a unit or as two separate gears suitably fastened together and are freely rotatable on a shaft 69 threaded into an extension of the side frame 8'. The gears 62, 65, 67 and 68 are removable with the tabbing unit. The gear 68 is driven by a continuously rotating gear 70 of the gluing device G.

As viewed in Figs. 4 and 14, the tabbing units 11 each comprises a casting 71 provided with outwardly extending ears 72 whose lower faces engage the bearing plates 73 suitably fastened, as by screws, to the under side of the transverse member 9 slidably to support the tabbing unit. Each of the tabbing units 11 may be individually moved, as by a crank handle 76, toward or away from a central position by threaded rods 74 or 74' each of which is journaled in a respective side frame 8 or 8' and engages a threaded boss 75 of a casting 71. The units may be clamped individually in their adjusted position by a bolt 77 which passes downwardly through a narrow slot in the upper face of the cross bar 9 and threadably engages the upper portion of the casting 71, the bottom surface of the head of the bolt engaging the upper face of the cross bar.

To each of the castings 71 there is secured, as by bolts 78, a bifurcated bracket member 79. One arm of the bracket 79 threadably engages an end of a stud shaft 80, the opposite end of which is threaded to receive a clamping nut 81 to hold in position the spiders 82, 83, held in spaced position on shaft or rod 80 by a bushing 84 on which a roll 85 of suitable tabbing material, as paper, is disposed. The tabbing strip, as it is removed from the roll 85, passes over an idler roll 86 disposed and freely rotatable on the stud shaft 87 threaded into the other arm of the bracket 79 and thereafter passes over a second idler roll 88 similarly mounted on the end of one arm of a bell crank lever 89, to the end of the other arm of which is fastened a biasing spring 90 tending to cause clockwise rotation of the bell crank lever 89, as viewed in Fig. 4, for the purpose of forming a brake to prevent movement of roll 85 under its own inertia by maintaining a substantially constant tension on the tab strip. The strip thereafter passes under an idler roll 91 disposed between the side walls of the unit casting 71 onto a plate 92 formed by the bottom of the casting which may be provided with a groove or spaced ridges for the purpose of guiding the strip, as shown in Fig. 6.

The constantly rotating shaft 33, preferably of polygonal cross section, extends through and effects the rotation of gear 93 of the respective tabbing units to drive the tab strip feed rolls 94, 95 through an intermediate idler gear 96 which engages gear 93 and gear 97 secured to the shaft of feed roll 95. The hollow shaft of gear 93 and the shafts of gears 96 and 97 remain fixed with respect to the casting 71 and to each other, but the shaft of roller 94 is movable with respect thereto as hereinafter described, although the motion is so limited that the gear 98 mounted on the end thereof is always in engagement with gear 97.

Referring to Figs. 4, 30, and 31, the rock shaft 99 passes through and is journaled in the side frame 8' and passes through the hub portion of oscillating arms 100 which are each disposed between the side walls of a tabbing unit casting 71; preferably the shaft is polygonal in cross section and corresponds in shape to the hole through which it passes in the hub portion 99. Preferably the end of the hub portion is split and extends exteriorly of the casting. A hollow nut 99' having a slight internal taper is threaded onto the split extension to clamp the rocker arm tightly in position after adjustment of the tabbing unit has been effected by rod 74, as above described. Under the influence of a spring 101 which is disposed between an abutment on the side frame 8' and the end of a lever 102 fastened to the end of shaft 99, the oscillating arm 100 tends to rotate clockwise, as viewed in Fig. 4, to bring a spring-pressed plunger 103 carried thereby into engagement with the tabbing strip. To permit the initial introduction of the tab strip through the casting 71 to the feed rolls, with the rocker arm 100 in its biased position, the spring plunger 103 is raised, as shown in Figs. 34 and 35, against action of its spring by engagement between the flanged head 104 of the plunger and a cam 105 mounted or formed on the inner extremity of a rod which passes through a side of a casting 71 and is provided exteriorly thereof with a handle member 106 adapted to be manually manipulated.

To the shaft 99 there is also affixed a lever arm 107 which may extend from and be integral with the hub portion of the lever 102. Referring to Fig. 22, the free end of the rocker arm 107 is provided with a head portion 108 having a slot or hole therethrough in which a slidably adjustable block 109 is received and through the lower end of which passes a shaft 110 to provide a bearing for the rollers 111 and 111' disposed on opposite sides of the block 109. An adjusting member 112 projects through a plate 113 fastened, as by screws, to the upper face of the head 108 and is provided with flanges which engage respectively the opposite sides of the plate to prevent lateral movement during rotation of the adjusting screw 112 which, at its lower end and within the slot, threadably engages the upper end of the block 109. The block is clamped in its desired adjusted position by a threaded member 114 which extends through an elongated slot 115 in the side of the head 108 and threadably engages the block 109.

The rollers 111 and 111' are adapted to engage, respectively, the cams 116 and 116' adjustably pivoted to a timing disk 117 suitably attached to the elongated hub portion of the gear 62. Upon engagement of a cam and its corresponding roller, the arm 107 is rotated in a counter-clockwise direction, as viewed in Fig. 21, about shaft 99, causing rotation of the rocker arms 100 to the position shown in Fig. 4, releasing the spring-pressed plunger 103 from engagement with the tab strip and bringing the upper feed roll 94 into contact therewith and with the lower roll 95 to feed the tab strip to the left, as viewed in Fig. 4, during the continued engagement between the cam and its follower. Each of the cams 116 and 116' is pivotally mounted on a pin 118 adjustably clamped in a desired position in an arcuate slot 119 in the corresponding face of the timing disk 117. Each of the cams is provided with a spring-pressed plunger projecting from the inside face of the cam and engaging a circular track portion concentric to the timing disk 117 to force the cam to rotate about its pivot 118 and away from the axis of rotation of the timing disk, which rotation, however, is limited by a pin 120 projecting from the face of the cam adjacent the timing disk into the slot 119, as shown most clearly in Fig. 19.

As the timing disk 117 rotates, the inner face of the cam 116 carried thereby is periodically engaged, once every revolution, by a roller 121 freely rotatable on a stud shaft projecting horizontally from a lug 122 of a hub member 123 having a bearing liner 124 mounted on and supported from the hub extension of the gear 62. To vary the position of the roller 121, the hub member 123 is provided with a manually adjustable arm 125 through which, near the outer extremity thereof, extends a clamping pin 126 which projects through an arcuate slot 127 in the side frame 8' and the head of which is adapted to engage the edges of the slot and to be clamped to the side frame by tightening of the nut 128 threaded on the other end of the clamp pin 126.

Similarly the inner face of the cam 116' is engaged once for each revolution of the timing disk 117 by a roller 129 mounted on a horizontally projecting shaft affixed to the adjustable plate or disk 130 locked in any desired position by a nut or clamping member 131 which threadably engages a reduced threaded extension of stud shaft 63.

Figure 25:
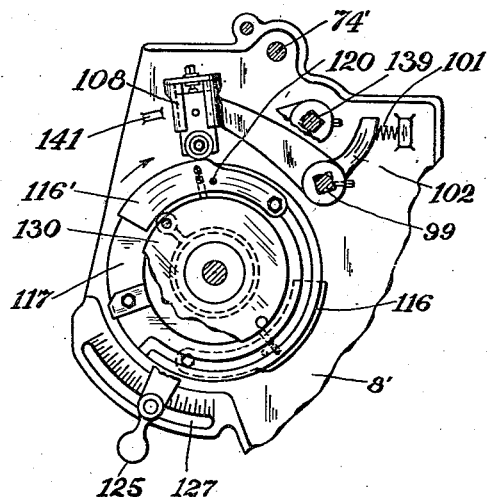
Figure 26:
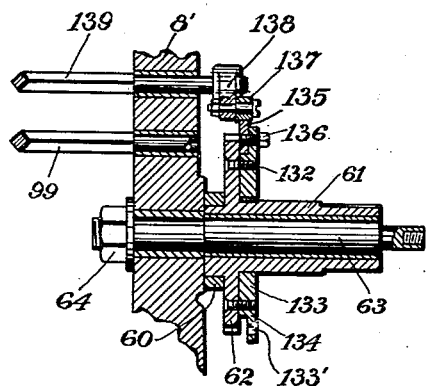
Figs. 26 and 27 are end sectional and front elevational views of the actuating cams and associated mechanism of the tab-cutting knives.
Figure 27:
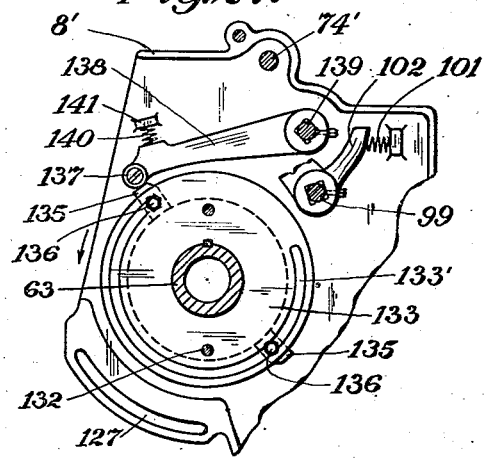

The length of time during which the rolls 111 and 111' are in contact with their respective cams, and therefore the duration of the feeding of the tab strip, is determined by the distance between the point of contact between roll 121 or 129 and cam 116 or 116', respectively, with respect to the free end of that cam at the time of initial engagement between the roll 111 or 111' and the cooperating face of the corresponding cam, since, when the free end of the cam passes beyond the respective adjustable roller 121 or 129, the spring 101, through the arm 107, forces the corresponding cam, which is no longer rigidly supported, inwardly, effecting rotation of the shaft 99 in a clockwise direction, as viewed in Fig. 4, to terminate the feeding engagement between the rolls 94 and 95 and the tab strip and to bring the spring-pressed plunger 103 into braking engagement therewith. For example, the adjustment of rolls 121 and 129, as shown in Figs. 20 to 22 inclusive, would result in tab strip feeding periods relatively long with respect to those resulting when the rolls are in the position indicated in Figs. 24 and 25. The arm 125 and the disk or plate 130 are provided with or cooperate with a calibrated scale and an indicator, as shown in Figs. 20 and 23, for example, to facilitate adjustment of the tab strip feeding periods and, therefore, of the length of the tabs.

The interval between the tab-feeding periods, and therefore of the spacing of the tabs on the wrapper, is varied by changing the relative position of the cams 116 and 116' with respect to each other, as by moving one or both pivot pins 118 thereof to a desired position or positions in their respective slots 119.

Suitably secured to the gear 62, as by screws 132, is a plate 133 having an arcuate slot 133' near the edge thereof extending through a substantial angle which may be, as shown, approximately 270°. In a flanged portion 134 of the plate, between the flange thereof and the adjacent face of the gear 62, are adjustably disposed the cams 135 adapted to be clamped in their adjusted position by bolts 136 extending through the slot 133' and threadably engaging the respective cam 135. During rotation of the gear 62 the cams 135 periodically and alternately engage a roller 137 freely rotatable on a stud shaft projecting from and at the end of an arm 138 secured to the end of a shaft 139 and biased towards the periphery of plate 133 by a spring 140 disposed between a fixed abutment 141 on the side plate of frame 8' and the upper side of the arm 138. The shaft 139 rocked by engagement of roller 137 and cams 135 passes through circular blocks 142, Fig. 4, disposed within the tabbing unit frames or castings 71 and internally contoured to fit the polygonal shape of the shaft. The tab cutting operation is controlled by an arm 143 having a rounded end 144 engaging an opening in the cutter blade 145, and having a hub 146 rotatably mounted on circular block 142 and adjustably positioned thereon by screws 147 threaded into the hub and having opposed engagement with shoulders, not shown, in block 142, produced by suitably recessing the block. The cutter blade 145 reciprocates between a fixed blade 148 suitably secured to the casting 71 and a pressure plate 149 forced against the cutter blade by spring 150 whose tension may be varied in any desired manner.

Operating in timed relation to the sheet-feeding mechanism of the gluing apparatus, the oscillating arm carrying the feed roll 94 is actuated by engagement of the rocker arm 107 with cam 116 (or 116') to bring the feed rolls 94 and 95 into contact with the tab strip which is simultaneously relieved of the action of the plunger 103. Strippers 151 and 152 cooperate with grooves in feed rolls 94 and 95 to prevent the tab strip from adhering thereto. After the tab strip is fed a desired amount as determined by the setting of adjustable members 125 and 130, the oscillating arm 100 is rotated in a reverse direction by the spring 101 as above described. During the tab strip feeding operation, the free end of the tab strip contacts with the adhesive-coated intermediate roller 18 which is continuously rotating in a counter-clockwise direction as viewed in Fig. 4, to exert a definite pull on the strip so that when a tab is severed from the strip by the cutter blade 145, it is at once dragged by the roll into engagement therewith simultaneously to apply adhesive to the roll-engaging face of the tab and to carry the tab into engagement with the wrapper-coating roller 7, whereupon the strippers 153 mounted on a rod 154, extending between the side frames 8, 8', separate the tab from the intermediate roll 18. The tab, now coated on both sides with adhesive, is transported by the roller 7 and applied to a wrapper S while a coating of adhesive or glue is being applied to the wrapper and while a portion remains to be coated. A second group of tabs in the meanwhile has been cut, the interval being determined as above explained by the spacing between cams 116 and 116', and is applied subsequently to the wrapper while there yet remains a portion to be coated. Figs. 17 and 18 illustrate diagrammatically the operation described.

The leading edge of the wrapper when deflected from the roller 7 by the strippers 155 engages a porous or perforated conveyor belt 156 driven by rollers 157 connected through suitable gearing or the like to the driving mechanism of the gluer G. The conveyor belt passes over a suction chamber 158, preferably having a perforated top, and provided with a hinged nose portion 159 extending in close proximity to the roller 7 whereby suction is applied to wrapper immediately after it leaves the coating roller, to prevent curling.

The conveyor belt 156 passes over adjustable idler roll 160, and idler roll 161, which latter, together with the upper sheet-feeding rolls 6 and the conveyor belt-driving rolls 157, is mounted on a frame 162 pivoted, as at 163, to permit ready access to the gluing and tabbing mechanisms. The hinged nose portion 159 of the suction chamber 158 is engaged and moved to a clear position by the frame 162 when the latter is thrown back for the purpose specified.

In the arrangement disclosed, the tabbed, coated wrappers are removed from the conveyor belt 156 by the operator of a box-wrapping machine W under the control of the operator or of the gluing machine G as described in the Federwitz and Bailey application aforesaid. In either event, a box, particularly an unstayed box blank, is superimposed on a tabbed, coated wrapper in the path of the form-block structure B of the wrapping machine simultaneously to wrap and stay the box, as is exemplified, before material setting of any of the adhesive applied to the tabs or wrapper. During continued operation of the device, a succession of tabbed, coated wrappers is delivered by the conveyor to the operator to be applied to a succession of boxes.

What I claim is:

1. The method of preparing a tabbed, coated individual wrapper which comprises coating the wrapper, and substantially simultaneously applying tabs thereto.

2. The method of preparing a tabbed, coated individual wrapper which comprises coating the wrapper, and applying tabs to the wrapper while a portion thereof remains to be coated.

3. The method of preparing a tabbed, coated individual wrapper which comprises applying a coating of adhesive to a wrapper during movement of the wrapper along a path, and during application of said coating, applying tabs to the wrapper.

4. The method of preparing a tabbed, coated individual wrapper which comprises applying a coating of adhesive to a wrapper during movement of the wrapper along a path, and, while a portion of the wrapper remains to be coated, applying tabs to the wrapper.

5. The method of preparing a tabbed wrapper which comprises applying adhesive to faces of reinforcing strips or tabs, transporting said tabs by said applied adhesive, applying adhesive to opposite faces of said tabs, further transporting said tabs by said latter adhesive, and adhesively applying said tabs to the wrapper.

6. The method of preparing a tabbed wrapper which comprises applying adhesive to wrapper-engaging faces of reinforcing strips, transporting said tabs by said applied adhesive, applying adhesive to opposite faces of said tabs, further transporting said tabs by said latter adhesive, and adhesively applying said tabs to the wrapper.

7. The method of preparing a tabbed, coated individual wrapper which comprises coating the wrapper with adhesive, applying adhesive to reinforcing strips or tabs, transporting said tabs by the adhesive applied thereto, and applying said tabs to the wrapper during coating thereof.

8. The method of preparing a tabbed, coated individual wrapper which comprises coating the wrapper with adhesive, applying adhesive to reinforcing strips or tabs, transporting said tabs by the adhesive applied thereto, and applying said tabs to the wrapper while a portion remains to be coated.

9. The method of preparing a tabbed, coated wrapper which comprises applying a coating of adhesive to a wrapper during movement of the wrapper along a path, applying adhesive to reinforcing strips or tabs, transporting said tabs by the adhesive applied thereto, and applying said tabs to the wrapper during coating thereof.

10. The method of preparing a tabbed, coated individual wrapper which comprises coating the wrapper with adhesive, applying tabs to the wrapper and while a portion remains to be coated, and thereafter applying other tabs to the wrapper.

11. The method of preparing a tabbed, coated individual wrapper which comprises coating the wrapper with adhesive, applying tabs to the wrapper and while a portion remains to be coated, and thereafter applying other tabs to the wrapper while there remains a lesser portion thereof to be coated.

12. The method of applying tabbed wrappers to boxes, which comprises transporting individual wrappers in succession, progressively applying adhesive to each wrapper, applying tabs to the wrapper while a portion remains to be coated, coating the box-engaging faces of the tabs with adhesive, and before setting of the adhesive applying the tabbed wrappers to boxes in succession.

13. The method of applying tabbed wrappers to unstayed box blanks, which comprises transporting individual wrappers in succession, progressively applying adhesive to each wrapper, applying tabs to the wrapper while a portion remains to be coated, and before setting of the adhesive applying the tabbed wrappers to simultaneously wrap and stay unstayed box blanks in succession.

14. The method of preparing a tabbed wrapper for application to a box, which comprises coating a wrapper with adhesive, applying adhesive to the box-engaging faces of reinforcing strips or tabs, transporting said tabs by the applied adhesive, and applying said tabs to the wrapper during said coating thereof.

15. The method of preparing a tabbed wrapper for application to a box, which comprises coating a wrapper with adhesive, applying adhesive to the box-engaging faces of reinforcing strips or tabs, transporting said tabs by the applied adhesive, and applying said tabs to the wrapper during said coating thereof and while a portion of the wrapper remains to be coated.

16. Wrapper tabbing and coating mechanism comprising means for coating an individual wrapper with adhesive, and means to apply tabs to the wrapper during said coating thereof.

17. Wrapper tabbing and coating mechanism comprising means for coating an individual wrapper with adhesive, and means for applying tabs to the wrapper while a portion thereof remains to be coated.

18. Wrapper tabbing mechanism comprising a continuously movable, adhesive-coated member, means intermittently to feed wrappers in succession adjacent said member, and means operating in timed relation to said intermittent means to deliver tabs to said member.

19. Wrapper tabbing and coating mechanism comprising a continuously movable member having an adhesive-coated surface, means intermittently to feed wrappers in succession into contact with said surface, and means operating in timed relation to said intermittent means to deliver groups of tabs in succession to said surface.

20. The combination with mechanism for applying an adhesive coating to a wrapper, of means for supplying tabs and for applying them to said wrapper during application of said coating thereto, and means to convey said tabbed wrapper to a region removed from said mechanism.

21. The combination with mechanism for applying an adhesive coating to a wrapper, of means for supplying tabs and for applying them to said wrapper while a portion thereof remains to be coated.

22. Tabbing mechanism comprising means for feeding a tab strip, means to cut said strip into individual tabs, and means comprising an adhesive-coated roll to tension the free end of said strip and to transport tabs cut therefrom.

23. Wrapper tabbing mechanism comprising a continuously movable, adhesive-coated member, means intermittently to feed individual wrappers in succession adjacent said member, and means operating in timed relation to said intermittent means to deliver groups of tabs to said member.

24. Wrapper tabbing and coating mechanism comprising a movable member having an adhesive-coated surface, means to feed an individual wrapper into contact with said surface, and means operating in timed relation to said wrapper-feeding means to deliver groups of tabs to said surface.

25. Wrapper tabbing and coating mechanism comprising an adhesive-coated member to apply a coating to the entire surface of wrapper-engaging faces of tabs, and a second adhesive-coated member to apply said tabs and a coating of adhesive to a wrapper.

26. Wrapper tabbing mechanism comprising means for feeding a tab strip, means to cut said strip into individual tabs, and a plurality of adhesive-coated rolls which successively engage and transport said individual tabs.

27. Wrapper tabbing mechanism comprising means for feeding a tab strip, means to cut said strip into individual tabs, an adhesive-coated roll to engage the wrapper-engaging faces of said tabs, and a second adhesive-coated roll to engage the other faces of said tabs.

28. Wrapper coating and tabbing mechanism comprising means for feeding a tab strip, means to cut said strip into individual tabs, an adhesive-coated roll to engage the wrapper-engaging faces of said tabs, a second adhesive-coated roll to engage the other faces of said tabs, and means to feed wrappers adjacent said second roll whereby tabs and adhesive are applied to said wrappers.

29. A unit mechanism for attachment to a wrapper-feeding and gluing mechanism having a wrapper-coating roller and a glue reservoir comprising side frames adapted to be secured to said latter mechanism, tabbing units disposed between said frames, means supported by said frames to supply adhesive from said reservoir to said roller, and means supported by said frames to deliver tabs from said tabbing units to said roller.

30. A unit mechanism for attachment to a wrapper-feeding and gluing mechanism having a wrapper-coating roller and a glue reservoir comprising side frames adapted to be secured to said latter mechanism, tabbing units disposed between said frames, means supported by said frames to supply adhesive from said reservoir to said roller, and an adhesive-coated roller supported by said frames to deliver tabs from said tabbing units to said roller.

31. In tabbing mechanism, a movable adhesive-coated member, means to feed the free end of a tab strip into wiping engagement therewith, and means to cut individual tabs from said strip whereupon each tab as cut is drawn by the adhesive coating of said member into engagement therewith.

32. In tabbing mechanism, a movable, adhesive-coated member, means to feed the free ends of tab strips into wiping engagement therewith, and means to cut individual tabs from said strips whereupon the tabs as cut are drawn by the adhesive coating of said member into engagement therewith.

33. In tabbing mechanism, a movable adhesive-coated member, and tabbing units each comprising means to feed the free end of a tab strip into wiping engagement with said member, and means to cut individual tabs from said strip whereupon the tabs as cut are drawn by the adhesive coating of said member into engagement therewith.

34. In tabbing mechanism, strip feed rolls, an oscillating support for one of said rolls, a rocker arm associated with said support, cams alternately and periodically to engage said arm, and means to vary the effective length of said cams.

35. In tabbing mechanism, strip feed rolls, an oscillating support for one of said rolls, a rocker arm associated with said support, cams alternately and periodically to engage said arm, and means to vary individually the effective length of said cams.

36. In tabbing mechanism, strip feed rolls, an oscillating support for one of said rolls, a rocker arm associated with said support, a continuously rotatable member, an arcuate cam member pivoted at one end to said rotatable member periodically to engage said arm, and an adjustably fixed member to support said cam during engagement with said arm.

37. In tabbing mechanism, strip feed rolls, an oscillating support for one of said rolls, a rocker arm associated with said support, a continuously rotatable member, arcuate cam members pivoted each at one end to said rotatable member periodically and alternately to engage said arm, and adjustably fixed members to support cams during engagement with said arm.

38. In tabbing mechanism, strip feed rolls, an oscillating support for one of said rolls, a rocker arm associated with said support, a continuously rotatable disk, an arcuate cam member pivoted at one end to said rotatable disk periodically to engage said arm, and a cam supporting member concentric with said disk and adjustably fixed to vary the effective length of said cam.

39. In tabbing mechanism, strip feed rolls, an oscillating support for one of said rolls, a rocker arm associated with said support, a continuously rotatable member, adjustably spaced, arcuate cam members dispersed on opposite sides of said rotatable member alternately and periodically to engage said arm, and adjustably fixed members respectively to engage said cams during engagement with said arm.

40. In tabbing mechanism, strip feed rolls, an oscillating support for one of said rolls, a rocker arm to actuate said support, a cam periodically to engage said rocker arm, a tab strip cutter, a second rocker arm to actuate said cutter, and a second cam adjustable independently of said first cam periodically to engage said second rocker arm.

41. In tabbing mechanism, strip feed rolls, an oscillating support for one of said rolls, a rocker arm to actuate said support, adjustably spaced cams alternately and periodically to engage said rocker arm, a tab strip cutter, a second rocker arm to actuate said cutter, and cams adjustable independently of said first cams alternately and periodically to engage said second rocker arm.

42. A unit tabbing mechanism comprising a frame; tabbing units, each having strip feed rolls, one of which is mounted on an oscillating support, and a tab strip cutter, supported by said frame; a shaft supported by said frame to actuate said oscillating supports, a rocker arm on said shaft, cams periodically and alternately to engage said rocker arm, a second shaft supported by said frame to actuate said tab strip cutters, a second rocker arm on said shaft, and cams adjustable independently of said first cams alternately and periodically to actuate said second rocker arm.

43. The method of preparing a tabbed coated wrapper which comprises applying tabs to an adhesive-coated surface, applying an uncoated wrapper to said coated surface and overlying said tabs, and removing the tabs and wrapper from said surface as a unit.

44. The method of preparing a tabbed, coated wrapper which comprises progressively effecting engagement between an uncoated wrapper and an adhesive-coated surface bringing the tabs into contact with said adhesive-coated surface and thereafter into contact with said wrapper during its progressive engagement with said surface, and removing the tabs and wrapper from said adhesive-coated surface.

45. The method of preparing a tabbed, coated wrapper which comprises effecting engagement between a moving, adhesive-coated surface and tabs to effect coating and transportation of the tabs, bringing an uncoated wrapper into contact with said surface to effect application of adhesive thereto and engagement with said tabs, and removing the wrapper and tabs as a unit from said moving surface.

46. The method of preparing a tabbed, coated wrapper which comprises moving an uncoated wrapper and an adhesive-coated surface in intersecting paths to effect progressive application of adhesive to the wrapper, effecting engagement between tabs and said adhesive-coated surface to coat and transport the tabs, during the transportation of tabs and progressive coating of the wrapper effecting engagement between the wrapper and tabs, and removing the tabs and wrapper as a unit from said surface.

47. The method of preparing a tabbed wrapper which comprises effecting engagement between tabs and a moving adhesive-coated surface to effect coating and transportation of the tabs, moving a wrapper into adhesive contact with said tabs while carried by and moving with said surface, and thereafter stripping the tabs from said surface to permit further movement of the tabs with the wrapper.

48. Wrapper tabbing and coating mechanism comprising an adhesive-coated member, means to feed an uncoated wrapper into engagement with said member, means to deliver tabs to said member to permit substantially simultaneous engagement of said tabs and said adhesive-coated member with at least a portion of said wrapper, and means to strip said wrapper with the tabs adhering thereto from said member.

49. Wrapper tabbing and coating mechanism comprising an adhesive-coated roll for simultaneously applying adhesive and tabs to the box engaging face of an uncoated wrapper, means to feed individual uncoated wrappers into contact with said roll, and means to deliver tabs to said roll.

50. Wrapper tabbing mechanism comprising a pair of adhesive-coated rolls, means to feed wrappers into engagement with one of said rolls, means to feed tabs between said adhesive-coated rolls, and means to insure engagement between tabs emerging from the rolls and said one of said rolls.

51. Wrapper tabbing mechanism comprising a pair of adhesive-coated rolls, means to feed wrappers into engagement with one of said rolls, means to feed tabs between said adhesive-coated rolls, means to divert tabs emerging from between the rolls to said one of said rolls, and means to strip the tabbed wrappers from said one of said rolls.

52. Tabbing mechanism comprising a pair of tabbing units each including tab-strip feeding means and means for cutting the strip into tabs, an adhesive-coated roller for coating and transporting tabs from both units, and means for adjusting said units individually in a path parallel to the axis of rotation of said roller.

ERNEST G. RIDER.